(12) United States Patent
Hansen et al.

(10) Patent No.: US 7,826,547 B2
(45) Date of Patent: Nov. 2, 2010

(54) MIXED MODE PREAMBLE FOR MIMO WIRELESS COMMUNICATIONS

(75) Inventors: Christopher J. Hansen, Sunnyvale, CA (US); Jason A. Trachewsky, Menlo Park, CA (US); R. Tushar Moorti, Mountain View, CA (US); Christopher Young, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 603 days.

(21) Appl. No.: 11/079,962

(22) Filed: Mar. 15, 2005

(65) Prior Publication Data

US 2006/0088120 A1 Apr. 27, 2006

Related U.S. Application Data

(63) Continuation-in-part of application No. 10/973,595, filed on Oct. 26, 2004.

(60) Provisional application No. 60/651,100, filed on Feb. 8, 2005.

(51) Int. Cl.
  *H04B 7/02* (2006.01)
(52) U.S. Cl. .................. 375/267; 375/347; 375/299; 375/130; 375/295; 455/132; 455/504
(58) Field of Classification Search ................. 375/267, 375/347, 299, 130, 295; 455/132, 504
See application file for complete search history.

(56) References Cited

U.S. PATENT DOCUMENTS 7,233,773 B2 * 6/2007 Hansen et al. ............... 455/69

| | | | |
|---|---|---|---|
| 2003/0072452 A1 | 4/2003 | Mody et al. | |
| 2004/0047284 A1 | 3/2004 | Eidson | |
| 2005/0035885 A1 * | 2/2005 | Hosur et al. | 341/50 |
| 2005/0259567 A1 * | 11/2005 | Webster et al. | 370/208 |
| 2005/0276347 A1 * | 12/2005 | Mujtaba et al. | 375/299 |
| 2005/0281241 A1 * | 12/2005 | Webster et al. | 370/343 |
| 2005/0286474 A1 * | 12/2005 | van Zelst et al. | 370/334 |
| 2006/0251193 A1 * | 11/2006 | Kopmeiners et al. | 375/345 |
| 2007/0230403 A1 * | 10/2007 | Douglas et al. | 370/334 |
| 2007/0230431 A1 * | 10/2007 | Driesen et al. | 370/345 |
| 2008/0039107 A1 * | 2/2008 | Ma et al. | 455/450 |

OTHER PUBLICATIONS

Jianhua Liu et al: "A MIMO System with Backward Compatibility for OFDM Based WLANs"; Signal Processing Advances in Wireless Communications, 2003; SPAWC 2003; 4th IEEE Workshop on Rome, Italy Jun. 15-18, 2003; Piscataway, NJ, USA; IEEE, US, Jun. 15, 2003, pp. 130-134, XP010713389; ISBN: 0-7803-7858-X.

* cited by examiner

*Primary Examiner*—Shuwang Liu
*Assistant Examiner*—Kenneth Lam
(74) *Attorney, Agent, or Firm*—Garlick Harrison & Markison; Jessica W. Smith

(57) ABSTRACT

A preamble of a frame for a multiple input multiple output (MIMO) wireless communication for a first transmit antenna of the MIMO communication includes a legacy preamble portion in accordance with a legacy wireless communication protocol. The preamble of the frame for the MIMO wireless communication for the first transmit antenna also includes a current protocol preamble portion in accordance with a protocol of the MIMO wireless communication. The preamble of a frame for at least a second antenna of the MIMO communication includes a cyclically shifted legacy preamble portion for the frame. The preamble of the frame for the MIMO wireless communication for the second transmit antenna also includes a second current protocol preamble portion in accordance with a protocol of the MIMO wireless communication.

12 Claims, 8 Drawing Sheets

MIXED MODE PREAMBLE FOR MIMO WIRELESS COMMUNICATIONS

This patent application is claiming priority under 35 USC §120 as a continuation in part patent application to co-pending patent application entitled PREAMBLE FORMATS FOR MIMO WIRELESS COMMUNICATIONS, having a Ser. No. 10/973,595, and a filing date of Oct. 26, 2004 and under 35 USC §119 as a utility conversion of a provisionally filed patent application having the same title as the present patent application, a provisional Ser. No. 60/651,100, and a provisional filing date of Feb. 8, 2005.

BACKGROUND OF THE INVENTION

1. Technical Field of the Invention

This invention relates generally to wireless communication systems and more particularly to supporting multiple wireless communication protocols within a wireless local area network.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the standard to which a wireless communication device is compliant within a wireless communication system may vary. For instance, as the IEEE 802.11 specification has evolved from IEEE 802.11 to IEEE 802.11b to IEEE 802.11a and to IEEE 802.11g, wireless communication devices that are compliant with IEEE 802.11b may exist in the same wireless local area network (WLAN) as IEEE 802.11g compliant wireless communication devices. As another example, IEEE 802.11a compliant wireless communication devices may reside in the same WLAN as IEEE 802.11g compliant wireless communication devices. When legacy devices (i.e., those compliant with an earlier version of a standard) reside in the same WLAN as devices compliant with later versions of the standard, a mechanism is employed to insure that legacy devices know when the newer version devices are utilizing the wireless channel as to avoid a collision.

For instance, backward compatibility with legacy devices has been enabled exclusively at either the physical (PHY) layer (in the case of IEEE 802.11b) or the Media-Specific Access Control (MAC) layer (in the case of 802.11g). At the PHY layer, backward compatibility is achieved by re-using the PHY preamble from a previous standard. In this instance, legacy devices will decode the preamble portion of all signals, which provides sufficient information for determining that the wireless channel is in use for a specific period of time, thereby avoid collisions even though the legacy devices cannot fully demodulate and/or decode the transmitted frame(s).

At the MAC layer, backward compatibility with legacy devices is enabled by forcing devices that are compliant with a newer version of the standard to transmit special frames using modes or data rates that are employed by legacy devices. For example, the newer devices may transmit Clear to Send/Ready to Send (CTS/RTS) exchange frames and/or CTS to self frames as are employed in IEEE 802.11g. These special frames contain information that sets the NAV (network allocation vector) of legacy devices such that these devices know when the wireless channel is in use by newer stations.

Both of the existing mechanisms for backward compatibility suffer from a performance loss relative to that which can be achieved without backward compatibility and are used independently of each other.

Therefore, a need exists for a method and apparatus that enables multiple protocols to be supported within a wireless communication system, including wireless local area networks.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
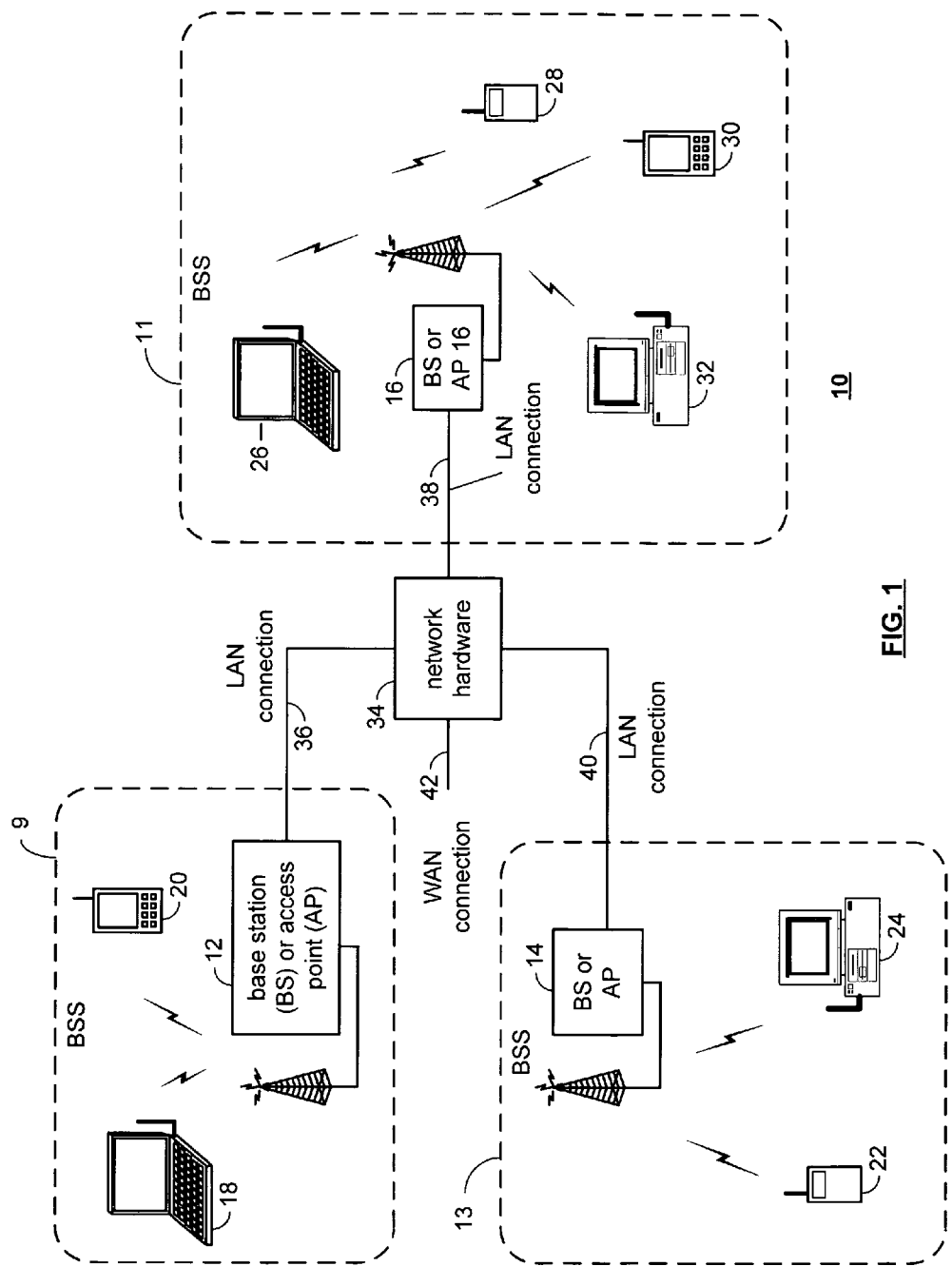
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 2 and/or 3.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its regional area, which is generally referred to as a basic service set (BSS) 9, 11, 13. Typically, the wireless communication devices register with a particular base station or access point 12-14 to receive services from the communication system 10. For direct connections (i.e., point-to-point communications), wireless communication devices communicate directly via an allocated channel to produce an ad-hoc network.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
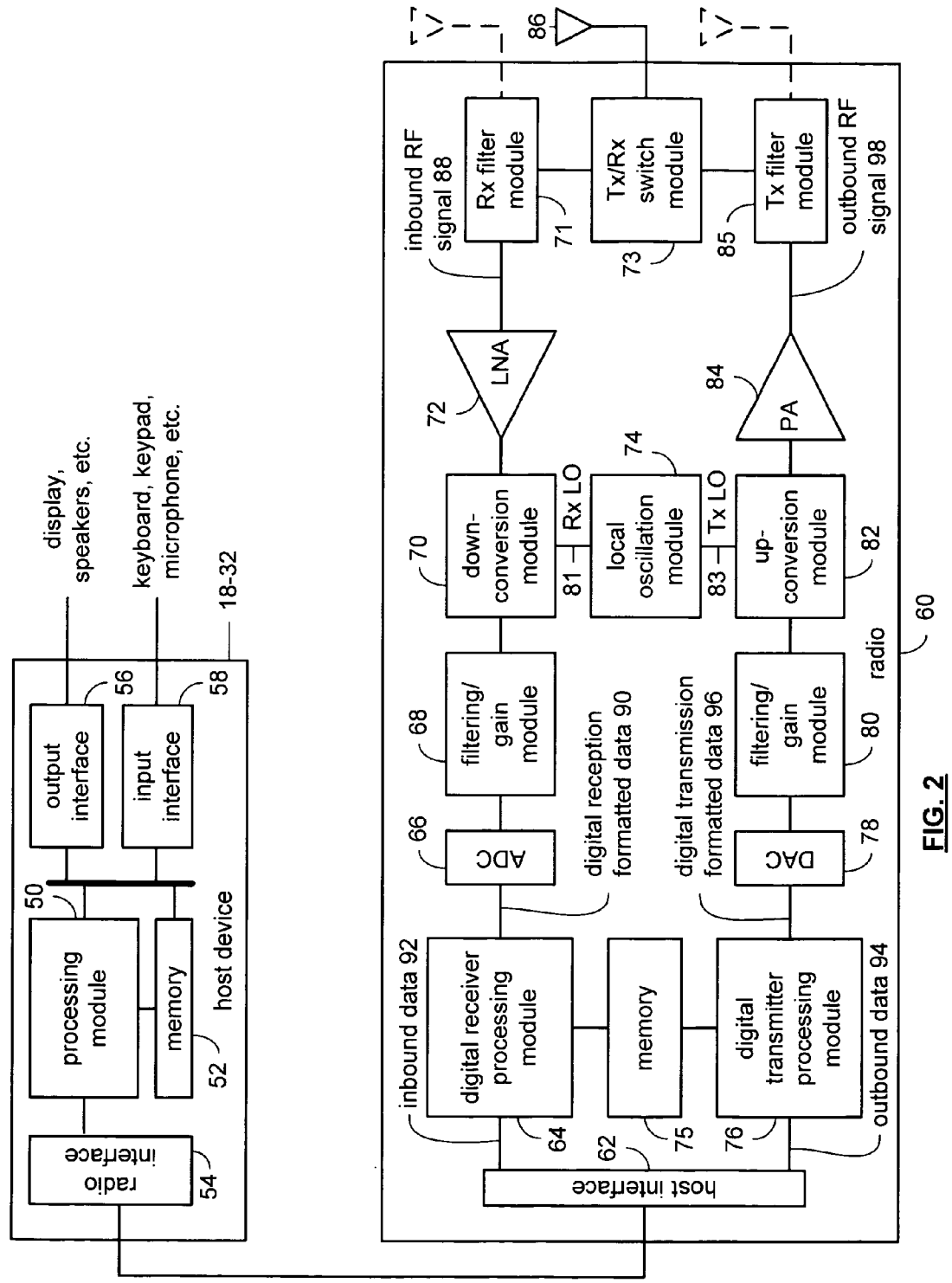
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, memory 75, a digital transmitter processing module 76, and a radio transceiver. The radio transceiver includes an analog-to-digital converter 66, a filtering/gain module 68, an IF mixing down conversion stage 70, a receiver filter 71, a low noise amplifier 72, a transmitter/receiver switch 73, a local oscillation module 74, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively, in accordance with one or more wireless communication standards and as further function to implement one or more aspects of the functionality described with reference to FIGS. 3-11. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 and versions thereof, Bluetooth and versions thereof, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
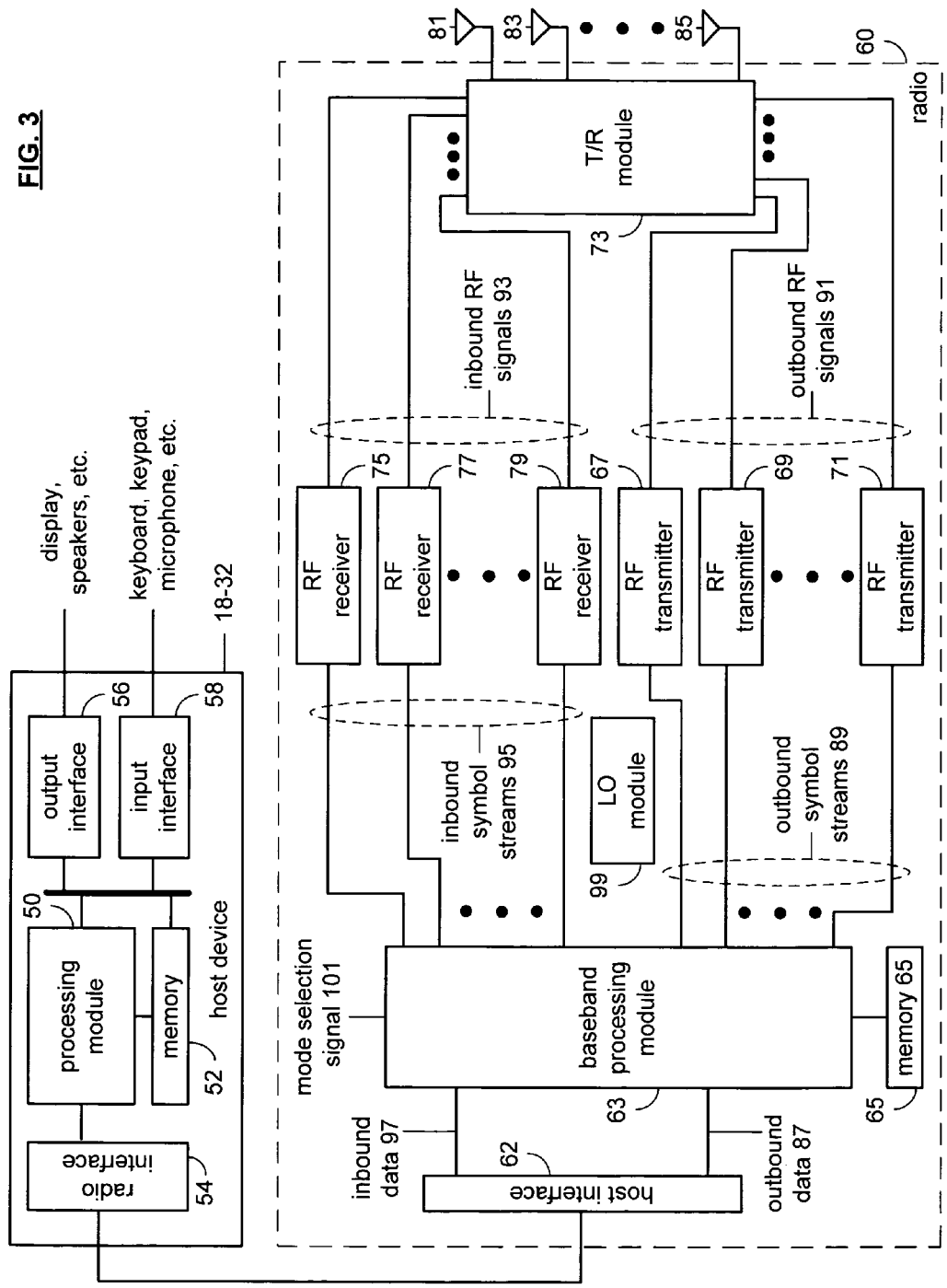
FIG. 3 is a schematic block diagram of another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

Radio 60 includes a host interface 62, a baseband processing module 63, memory 65, a plurality of radio frequency (RF) transmitters 67, 69, 71, a transmit/receive (T/R) module 73, a plurality of antennas 81, 83, 85, a plurality of RF receivers 75, 77, 79, and a local oscillation module 99. The baseband processing module 63, in combination with operational instructions stored in memory 65, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and/or digital baseband to IF conversion. The baseband processing modules 63 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 63 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 87 from the host device via the host interface 62. The baseband processing module 63 receives the outbound data 87 and, based on a mode selection signal 101, produces one or more outbound symbol streams 89. The mode selection signal 101 will indicate a particular mode as are indicated in mode selection tables. For example, the mode selection signal 101, with reference to table 1 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS), error vector magnitude in decibels (EVM), sensitivity which indicates the maximum receive power required to obtain a target packet error rate (e.g., 10% for IEEE 802.11a), adjacent channel rejection (ACR), and an alternate adjacent channel rejection (AACR).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennas may be utilized to achieve the higher bandwidths. In this instance, the mode select would further indicate the number of antennas to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennas and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennas and a corresponding spatial time code rate. Table 10 further illustrates a particular modulation scheme code rate and NBPSC values. Table 11 provides the power spectral density mask for table 10 and table 12 provides the channelization for table 10.

The baseband processing module 63, based on the mode selection signal 101 produces the one or more outbound symbol streams 89 from the output data 88. For example, if the mode selection signal 101 indicates that a single transmit antenna is being utilized for the particular mode that has been selected, the baseband processing module 63 will produce a single outbound symbol stream 89. Alternatively, if the mode select signal indicates 2, 3 or 4 antennas, the baseband processing module 63 will produce 2, 3 or 4 outbound symbol streams 89 corresponding to the number of antennas from the output data 88.

Depending on the number of outbound streams 89 produced by the baseband module 63, a corresponding number of the RF transmitters 67, 69, 71 will be enabled to convert the outbound symbol streams 89 into outbound RF signals 91. The implementation of the RF transmitters 67, 69, 71 will be further described with reference to FIG. 4. The transmit/receive module 73 receives the outbound RF signals 91 and provides each outbound RF signal to a corresponding antenna 81, 83, 85.

When the radio 60 is in the receive mode, the transmit/receive module 73 receives one or more inbound RF signals via the antennas 81, 83, 85. The T/R module 73 provides the inbound RF signals 93 to one or more RF receivers 75, 77, 79. The RF receiver 75, 77, 79, which will be described in greater detail with reference to FIG. 4, converts the inbound RF signals 93 into a corresponding number of inbound symbol streams 96. The number of inbound symbol streams 95 will correspond to the particular mode in which the data was received (recall that the mode may be any one of the modes illustrated in tables 1-12). The baseband processing module 63 receives the inbound symbol streams 89 and converts them into inbound data 97, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 63 and memory 65 may be implemented on a second integrated circuit, and the remaining components of the radio 60, less the antennas 81, 83, 85, may be implemented on a third integrated circuit. As an alternate example, the radio 60 may be implemented on a single integrated circuit. As yet another example, the processing module 50 of the host device and the baseband processing module 63 may be a common processing device implemented on a single integrated circuit. Further, the memory 52 and memory 65 may be implemented on a single integrated circuit and/or on the same integrated circuit as the common processing modules of processing module 50 and the baseband processing module 63.

Figure 4:
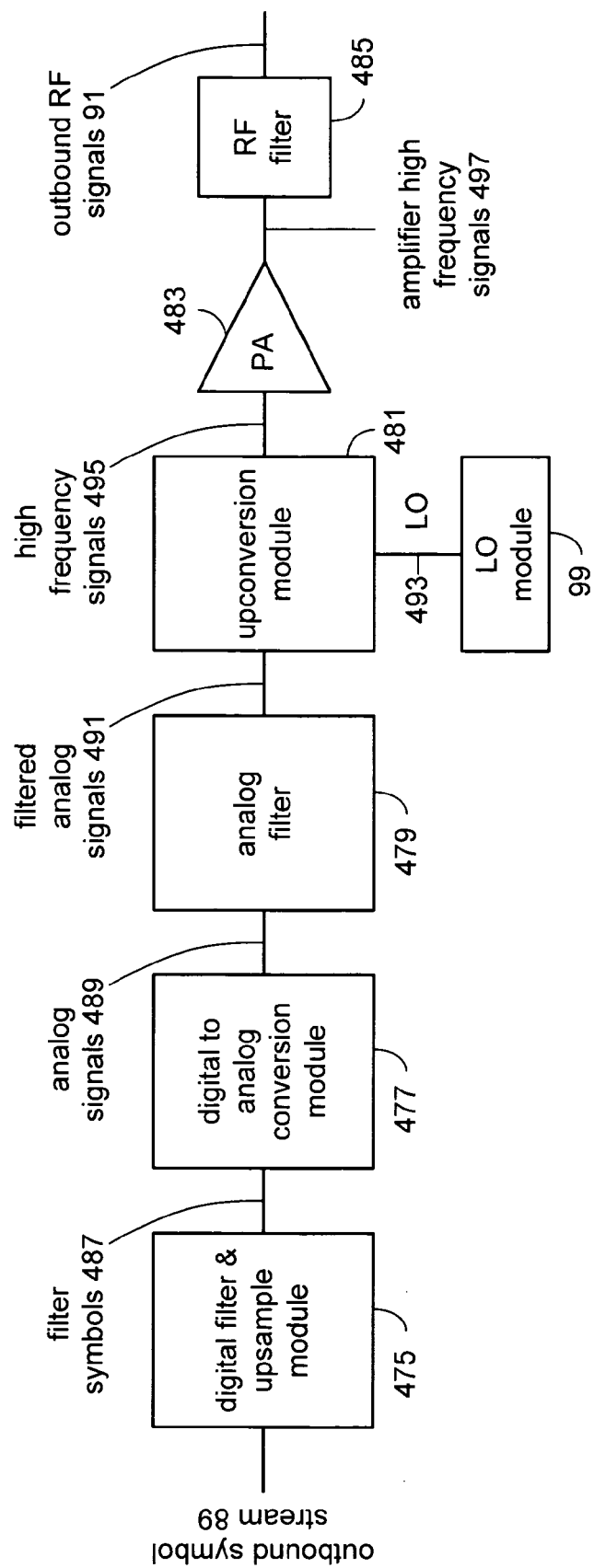
FIG. 4 is a schematic block diagram of an RF transmitter in accordance with the present invention.

FIG. 4 is a schematic block diagram of an embodiment of an RF transmitter 67, 69, 71. The RF transmitter includes a digital filter and up-sampling module 475, a digital-to-analog conversion module 477, an analog filter 479, and up-conversion module 81, a power amplifier 483 and a RF filter 485. The digital filter and up-sampling module 475 receives one of the outbound symbol streams 89 and digitally filters it and then up-samples the rate of the symbol streams to a desired rate to produce the filtered symbol streams 487. The digital-to-analog conversion module 477 converts the filtered symbols 487 into analog signals 489. The analog signals may include an in-phase component and a quadrature component.

The analog filter 479 filters the analog signals 489 to produce filtered analog signals 491. The up-conversion module 481, which may include a pair of mixers and a filter, mixes the filtered analog signals 491 with a local oscillation 493, which is produced by local oscillation module 99, to produce high frequency signals 495. The frequency of the high frequency signals 495 corresponds to the frequency of the RF signals 492.

The power amplifier 483 amplifies the high frequency signals 495 to produce amplified high frequency signals 497. The RF filter 485, which may be a high frequency band-pass filter, filters the amplified high frequency signals 497 to produce the desired output RF signals 91.

As one of average skill in the art will appreciate, each of the radio frequency transmitters 67, 69, 71 will include a similar architecture as illustrated in FIG. 4 and further include a shut-down mechanism such that when the particular radio frequency transmitter is not required, it is disabled in such a manner that it does not produce interfering signals and/or noise.

Figure 5:
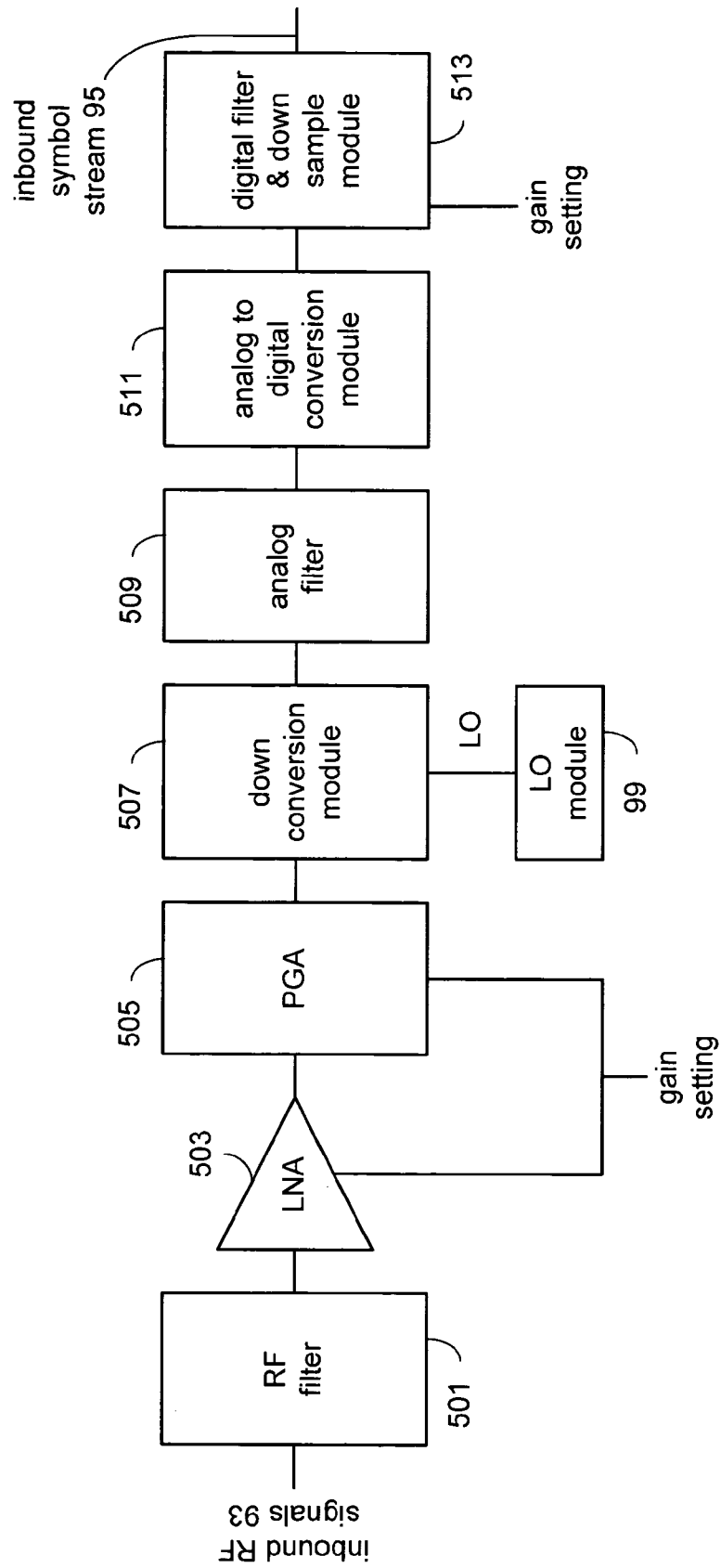
FIG. 5 is a schematic block diagram of an RF receiver in accordance with the present invention.

FIG. 5 is a schematic block diagram of each of the RF receivers 75, 77, 79. In this embodiment, each of the RF receivers includes an RF filter 501, a low noise amplifier (LNA) 503, a programmable gain amplifier (PGA) 505, a down-conversion module 507, an analog filter 509, an analog-to-digital conversion module 511 and a digital filter and down-sampling module 513. The RF filter 501, which may be a high frequency band-pass filter, receives the inbound RF signals 93 and filters them to produce filtered inbound RF signals. The low noise amplifier 503 amplifies the filtered inbound RF signals 93 based on a gain setting and provides the amplified signals to the programmable gain amplifier 505. The programmable gain amplifier further amplifies the inbound RF signals 93 before providing them to the down-conversion module 507.

The down-conversion module 507 includes a pair of mixers, a summation module, and a filter to mix the inbound RF signals with a local oscillation (LO) that is provided by the local oscillation module to produce analog baseband signals. The analog filter 509 filters the analog baseband signals and provides them to the analog-to-digital conversion module 511 which converts them into a digital signal. The digital filter and down-sampling module 513 filters the digital signals and then adjusts the sampling rate to produce the inbound symbol stream 95.

Figure 6:
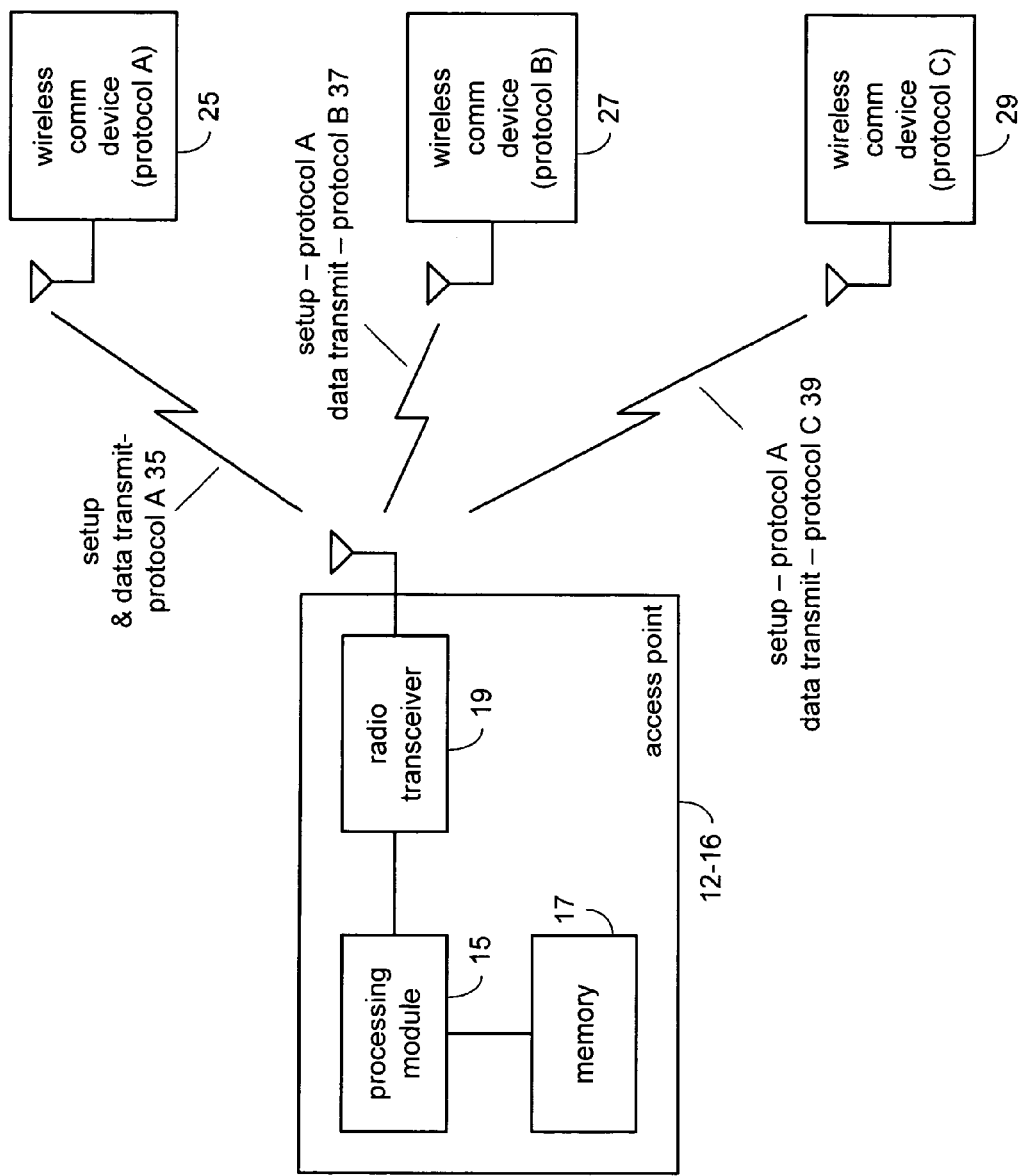
FIG. 6 is a schematic block diagram of an access point communicating with wireless communication devices in accordance with the present invention.

FIG. 6 is a schematic block diagram of an access point 12-16 communicating with wireless communication devices 25, 27 and/or 29. The wireless communication devices 25, 27 and/or 29 may be any one of the devices 18-32 illustrated in FIGS. 1-3. In this illustration, access point 12-16 includes a processing module 15, memory 17 and a radio transceiver 19. The radio transceiver 19 may be similar to the radio transceiver of each wireless communication device in architecture and may include a plurality of antennas, transmit paths and receive paths for multiple wireless communications within a proximal region or basic service set. The processing module 15 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 17 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 15 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 17 stores, and the processing module 15 executes, operational instructions corresponding to at least some of the steps and/or functions illustrated in FIGS. 7-32.

In this illustration, each of the wireless communication devices 25, 27 and 29 utilize a different wireless communication protocol. As illustrated, wireless communication device 25 utilizes protocol A 35, wireless communication device 27 utilizes protocol B 37 and wireless communication device 29 utilizes protocol C 39. For example, protocols A, B and C may correspond to different versions of the IEEE 802.11 standard. In particular, protocol A may correspond to IEEE 802.11b, protocol B may correspond to IEEE 802.11g and protocol C may correspond to IEEE 802.11n.

The protocols may be ordered in accordance with a protocol ordering table that has protocol A, protocol B and protocol C listed in order. The ordering may be based on the legacy of each of the corresponding protocols where the first protocol in the ordering is the oldest standard and the last entry in the protocol ordering is the most current standard. For example, in this present illustration protocol A may correspond to IEEE 802.11b, protocol B may correspond to IEEE 802.11g and protocol C may correspond to IEEE 802.11n. Alternatively, the protocol ordering may be based on a user defined and/or system administrator defined procedure. For instance, if an unacceptable number of transmission errors occur due to non-recognition of frames while utilizing protocol A to set-up wireless communications, the user may select the protocol B format for setting up a wireless communication. This concept will be described in greater detail with reference to the remaining figures.

In operation, the access point 12-16, and/or each of the wireless communication devices 25, 27 and 29, determine the protocol utilized by each of the wireless communication devices within the proximal region. Recall that the proximal region may include a basic service set and/or neighboring basic service sets and/or a direct, or ad-hoc network wherein the wireless communication devices communicate directly. Once the protocol of each of the wireless communication devices has been determined, the access point 12-16 and/or the wireless communication devices 25-29 determine, based on the protocol ordering, which protocol will be utilized to set-up a wireless communication. For instance, if protocol A corresponds to IEEE 802.11b, the communication devices will utilize a MAC level protection mechanism to set-up a wireless communication. As such, each of the wireless communication devices will utilize protocol A to set-up, or establish, a wireless communication such that the legacy devices recognize that a wireless communication is being set-up and also recognizes the duration of that wireless communication such that it will not transmit during that time, thus avoiding a collision.

Once the wireless communication is established, or set-up, utilizing a selected protocol (e.g., protocol A) from the protocol ordering, the communication device then utilizes its protocol to transmit the data for the remainder of the wireless communication. For example, wireless communication device 25 will utilize protocol A to establish and to transmit data for a wireless communication. Wireless communication device 27 will utilize protocol A to set-up a wireless communication and then use protocol B for the corresponding data transmission of the wireless communication. Similarly, wireless communication device 29 will utilize protocol A to establish, or set-up, the wireless communication and then use protocol C for the data transmission portion of the wireless communication.

As one of average skill in the art will appreciate, if the proximal region only includes wireless communication devices that utilize the same protocol, the set-up and data transmission is done using that protocol. As one of average skill in the art will further appreciate, if only two different protocols are present within the proximal region, the legacy protocol will be selected as the set-up protocol.

Figure 7:
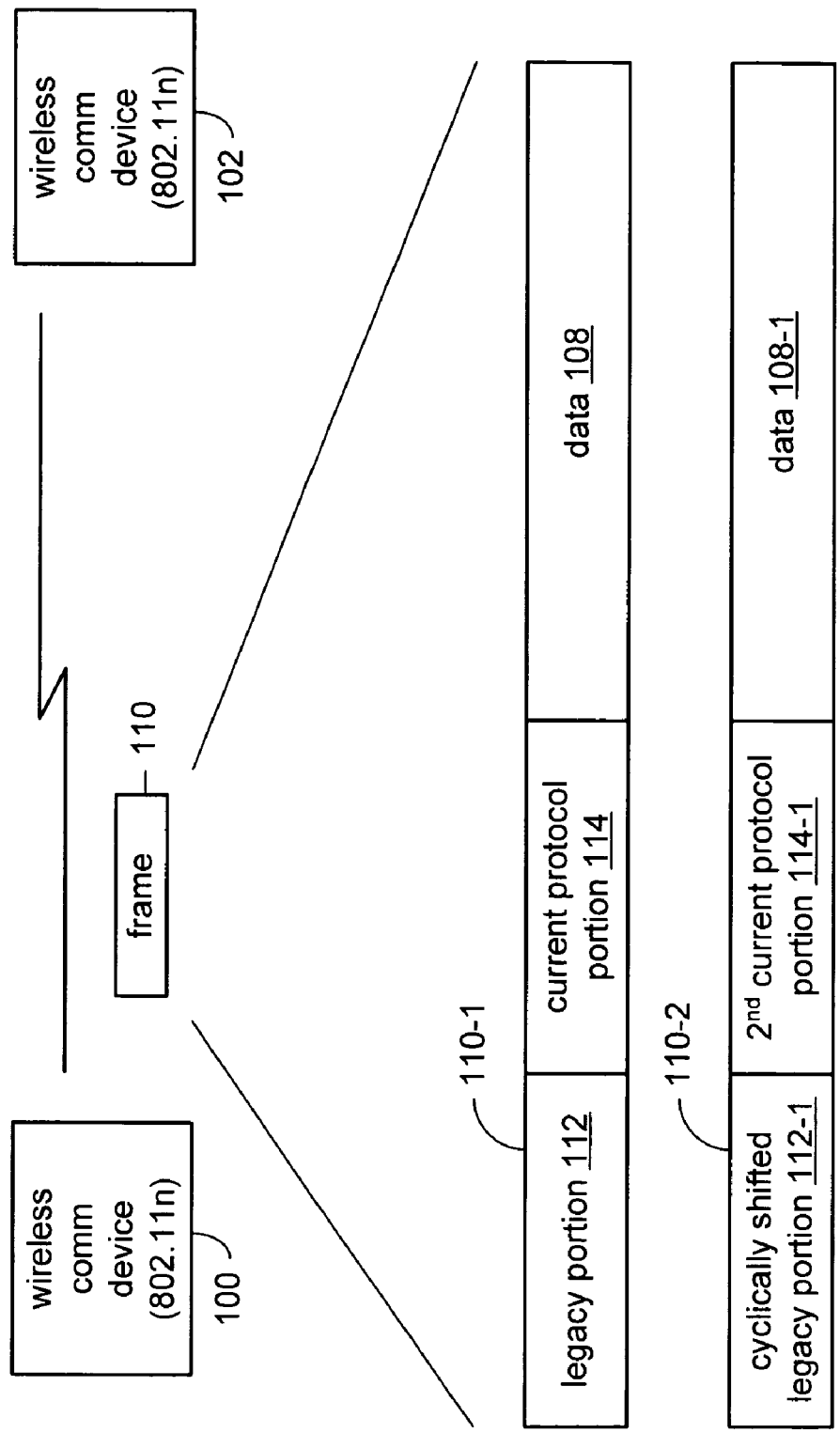
FIG. 7 is a diagram depicting a MIMO wireless communication in accordance with the present invention.

FIG. 7 is a diagram of a wireless communication between two wireless communication devices 100 and 102, each of which is compliant with IEEE 802.11n. Such a communication is taking place within a proximal area that includes 802.11n compliant devices, 802.11a compliant devices and/or 802.11g compliant devices. In this instance, the wireless communication may be direct or indirect where a frame 110 includes a first transmit antenna portion 110-1 and a second transmit antenna portion 110-2. The first transmit antenna portion 110-1 includes a preamble and a data section 108. The preamble includes a legacy portion 112 and a current protocol portion 114, remaining set-up information portion 114. The second transmit antenna portion 110-2 includes a second preamble and a second data section 108-1. The second preamble includes a cyclically shifted legacy portion 112-1 and a second current protocol portion 114-1.

The legacy portion 112 of the preamble is formatted in accordance with one or more legacy wireless communication standards including, but not limited to, GSM, IEEE 802.11 (a), (b), (g), (j), Bluetooth, or versions thereof. Further, the legacy portion 112 includes at least a first training sequence and a second training sequence. Such training sequences are used to detect a signal, signal characteristics, and frame duration. The cyclically shifted legacy portion 112-1 of the preamble includes a cyclically shifted first training sequence and a cyclically shifted second training sequence. Note that the cyclically shifted legacy portion 112-1 of the preamble may include more cyclically shifted training sequences if the legacy portion 112 of the preamble includes more than two training sequences.

The cyclically shifted first training sequence is a replica of the first training sequence shifted in time with respect to the first training sequence. The shift in time is a fraction of the duration the preamble of the frame 110. For instance, the fraction of the duration of the preamble may range from +50 nanoseconds to +400 nanoseconds or range from −50 nanoseconds to −400 nanoseconds. The cyclically shifted second training sequence is a replica of the second training sequence shifted in time with respect to the first training sequence by the fraction of the duration of the preamble.

The current protocol preamble portion 114 and the second current protocol preamble portion 114-1 include additional training sequences for wireless communication devices that are compliant with the current wireless communication protocol (e.g., IEEE 802.11n). For instance, the current protocol preamble portion 114 may include additional supplemental long training sequences, which are each 4 microseconds in duration, a high data signal field, which is 4 microseconds in duration, to provide additional information regarding the frame. The data portion 108 includes the data symbols, which are 4 microseconds in duration. In this instance, the legacy protection is provided at the physical layer.

Figure 8:
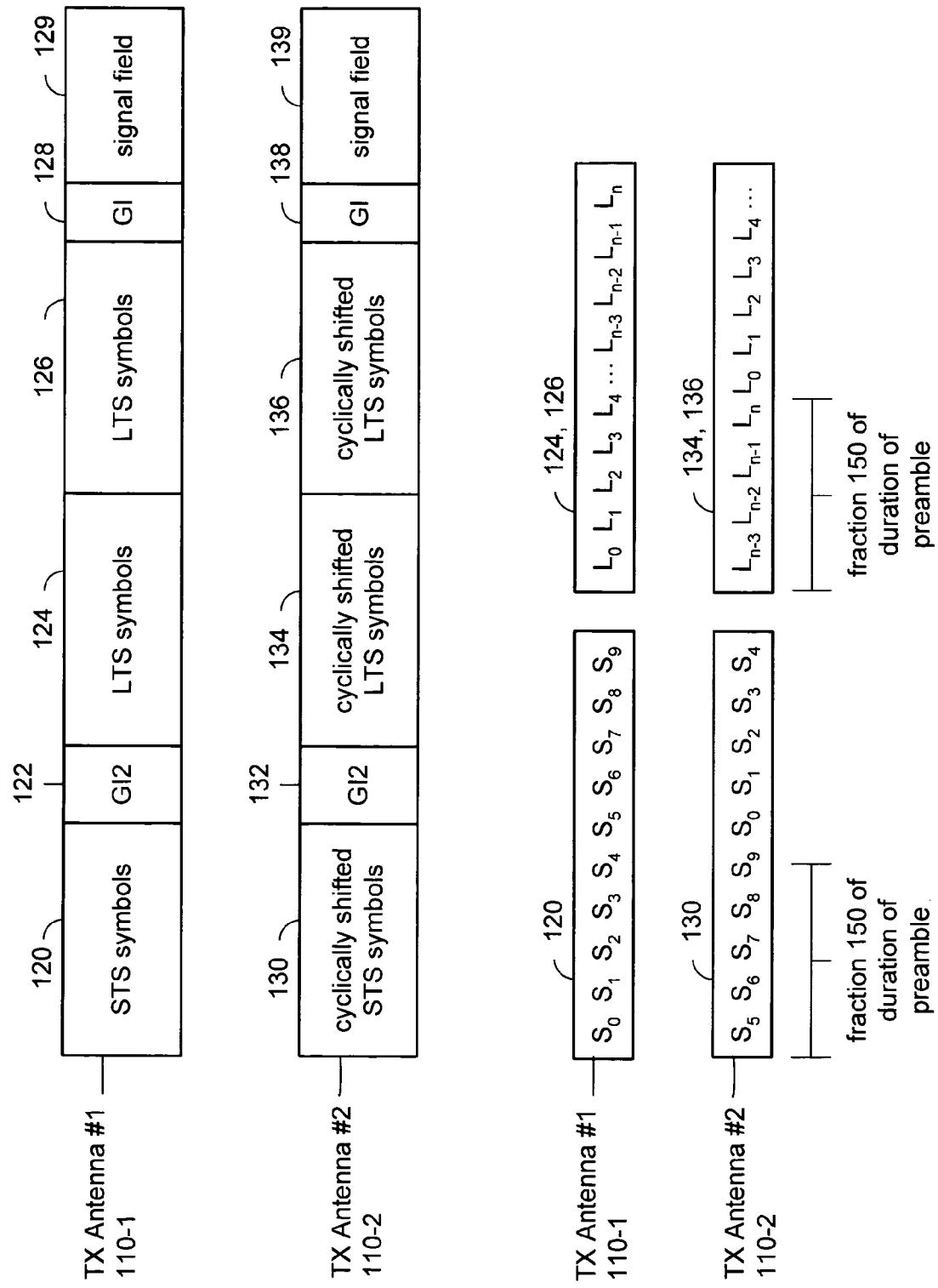
FIG. 8 is a diagram of an example preamble of the MIMO communication of FIG. 7.

FIG. 8 is a diagram of an example preamble of the MIMO communication of FIG. 7. In this example, the current wireless protocol is IEEE 802.11n and the legacy wireless communication protocol is IEEE 802.11(a) and/or (g). As is shown, the first transmit antenna frame portion 110-1 includes symbols of a short training sequence (STS) 120 as the first training sequence of the legacy portion 112 of the preamble, a double guard interval (GI2) 122, symbols of a long training sequence (LTS) 124, 126—repeated twice—as the second training sequence of the legacy portion 112 of the preamble, a guard interval (GI) 128, and a signal field 129. The second transmit antenna frame portion 110-2 includes cyclically shifted symbols of a short training sequence (STS) 130 as the cyclically shifted first training sequence of the cyclically shifted legacy portion 112-1 of the preamble, a double guard interval (GI2) 132, cyclically shifted symbols of a long training sequence (LTS) 134, 136—repeated twice—as the cyclically shifted second training sequence of the cyclically shifted legacy portion 112-1 of the preamble, a guard interval (GI) 138, and a signal field 139.

As is further shown, the cyclically shifted STS symbols 130 include the same symbols as the STS symbols 120, but shifted in time by a fraction 150 of the duration of the preamble. As mentioned, the fraction 150 may range from +/−50 nanoseconds to +/−400 nanoseconds. Similarly, the cyclically shifted LTS symbols 134, 136 include the same symbols as the LTS symbols 134, 136, but shifted in time by the same fraction 150 of the duration of the preamble.

In this example, the short training sequence (STS) symbols 120 are transmitted for a duration of 8 microseconds, as are the cyclically shifted STS symbols 130. The signal field 129, 139, which is 4 microseconds in duration, includes several bits to indicate the duration of the frame 110. As such, the IEEE 802.11a compliant devices within the proximal area and the 802.11g compliant devices within the proximal area will recognize frame 110 as being transmitted even though such devices will not be able to interpret the remaining portion of the frame. In this instance, the legacy devices (IEEE 802.11a and IEEE 802.11g) will avoid a collision with the IEEE 802.11n communication based on a proper interpretation of the legacy portion 112 of the preamble.

The preceding discussion has presented various embodiments for wireless communications in a wireless communication system that includes a plurality of wireless communication devices of differing protocols. For instance, more that two transmission antennas may be included in the frame. As one of average skill in the art will appreciate, other embodiments may be derived from the teachings of the present invention without deviating from the scope of the claims.

Mode Selection Tables:

TABLE 1

| 2.4 GHz, 20/22 MHz channel BW, 54 Mbps max bit rate | | | | | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

| PSD Mask | 1 |
|---|---|
| Frequency Offset | dBr |
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10

| PSD Mask | 2 |
|---|---|
| Frequency Offset | dBr |
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |

TABLE 12-continued

Channelization for Table 10

| Channel | Frequency (MHz) | Country | Channel | Frequency (MHz) | County |
|---|---|---|---|---|---|
| 151 | 5755 | USA | | | |
| 159 | 5795 | USA | | | |

What is claimed is:

1. A method for generating a preamble of a frame for a multiple input multiple output (MIMO) wireless communication, the method comprises:

for a first transmit antenna of the MIMO communication:
generating a legacy preamble portion for the frame in accordance with a first legacy standard wireless communication protocol, wherein the legacy preamble portion includes at least a first training sequence and a second training sequence and a signal field, wherein the signal field is generated in accordance with the legacy wireless communication protocol and includes an indication of a duration of the frame; and
generating a current protocol preamble portion for the frame in accordance with a second current standard wireless communication protocol of the MIMO wireless communication;

for at least a second antenna of the MIMO communication:
generating a cyclically shifted legacy preamble portion for the frame, wherein the cyclically shifted legacy preamble portion includes a cyclically shifted first training sequence and a cyclically shifted second training sequence and a cyclically shifted signal field, wherein the cyclically shifted first training sequence the cyclically shifted second training sequence is time-shifted with respect to the first training sequence by a fraction of duration of the legacy preamble portion, and wherein the cyclically shifted second training sequence is time-shifted with respect to the second training sequence by the fraction of duration of the legacy preamble portion, and wherein the cyclically shifted signal field is in accordance with the legacy wireless communication protocol and includes the indication of the duration of the frame; and
generating a second current protocol preamble portion for the frame in accordance with the second current standard wireless communication protocol of the MIMO wireless communication.

2. The method of claim 1 wherein the cyclically shifted signal field is time-shifted with respect to the signal field by the fraction of duration of the legacy preamble portion.

3. The method of claim 1 further comprises:
generating a double guard interval between the first and second training sequences in accordance with the legacy wireless communication protocol; and
generating a second double guard interval between the first and second cyclically shifted training sequences in accordance with the legacy wireless communication protocol.

4. The method of claim 1, wherein the fraction of the duration of the legacy preamble portion comprises at least one of, when the legacy wireless communication protocol is IEEE 802.11a or IEEE 802.11g:
a range of plus fifty nanoseconds to plus four hundred nanoseconds; and
a range of minus fifty nanoseconds to minus four hundred nanoseconds.

5. The method of claim 4 comprises:
the first training sequence including a short training sequence; and
the second training sequence including a long training sequence.

6. A radio frequency (RF) transmitter comprises:
a baseband processing module operably coupled to convert outbound data into outbound symbol streams; and
a transmitter section operably coupled to convert the outbound symbol streams into outbound RF signals, wherein the baseband processing module is operably coupled to:

for a first transmit antenna of the MIMO communication:
generate a legacy preamble portion for the frame in accordance with a legacy standard wireless communication protocol, wherein the legacy preamble portion includes at least a first training sequence and a second training sequence and a signal field, wherein the signal field is generated in accordance with the legacy wireless communication protocol and includes an indication of a duration of the frame; and
generate a current protocol preamble portion for the frame in accordance with a current standard wireless communication protocol of the MIMO wireless communication;

for at least a second antenna of the MIMO communication:
generate a cyclically shifted legacy preamble portion for the frame, wherein the cyclically shifted legacy preamble portion includes a cyclically shifted first training sequence and a cyclically shifted second training sequence and a cyclically shifted signal field, wherein the cyclically shifted first training sequence is time-shifted with respect to the first training sequence by a fraction of duration of the legacy preamble portion, and wherein the cyclically shifted second training sequence is time-shifted with respect to the second training sequence by the fraction of duration of the legacy preamble portion, and wherein the cyclically shifted signal field is in accordance with the legacy wireless communication protocol and includes the indication of the duration of the frame; and
generate a second current protocol preamble portion for the frame in accordance with the current standard wireless communication protocol of the MIMO wireless communication.

7. The RF transmitter of claim 6 wherein the cyclically shifted signal field is time-shifted with respect to the signal field by the fraction of duration of the legacy preamble portion.

8. The RF transmitter of claim 6, wherein the baseband processing module further functions to:
generate a double guard interval between the first and second training sequences in accordance with the legacy wireless communication protocol; and
generate a second double guard interval between the first and second cyclically shifted training sequences in accordance with the legacy wireless communication protocol.

9. The RF transmitter of claim 6, wherein the fraction of the duration of the legacy preamble portion comprises at least one of, when the legacy wireless communication protocol is IEEE 802.11a or IEEE 802.11g:
a range of plus fifty nanoseconds to plus four hundred nanoseconds; and
a range of minus fifty nanoseconds to minus four hundred nanoseconds.

10. The RF transmitter of claim 9 comprises:
- the first training sequence including a short training sequence; and
- the second training sequence including a long training sequence.

11. The RF transmitter of claim 6, wherein the legacy preamble portion is formatted in accordance with at least one of the following legacy wireless communication standards: GSM, IEEE 802.11(a), IEEE 802.11(b), IEEE 802.11(g), IEEE 802.11(j) and Bluetooth.

12. The RF transmitter of claim 11, wherein the current protocol preamble portion for the frame is formatted in accordance with the IEEE 802.11(n) current wireless standard communication standard.

* * * * *

UNITED STATES PATENT AND TRADEMARK OFFICE
CERTIFICATE OF CORRECTION

| | | |
|---|---|---|
| PATENT NO. | : 7,826,547 B2 | Page 1 of 1 |
| APPLICATION NO. | : 11/079962 | |
| DATED | : November 2, 2010 | |
| INVENTOR(S) | : Christopher J. Hansen et al. | |

It is certified that error appears in the above-identified patent and that said Letters Patent is hereby corrected as shown below:

Col. 17, line 35, in Claim 1: delete "the cyclically shifted second training sequence"

Signed and Sealed this
Fifth Day of June, 2012

David J. Kappos
*Director of the United States Patent and Trademark Office*